United States Patent Office.

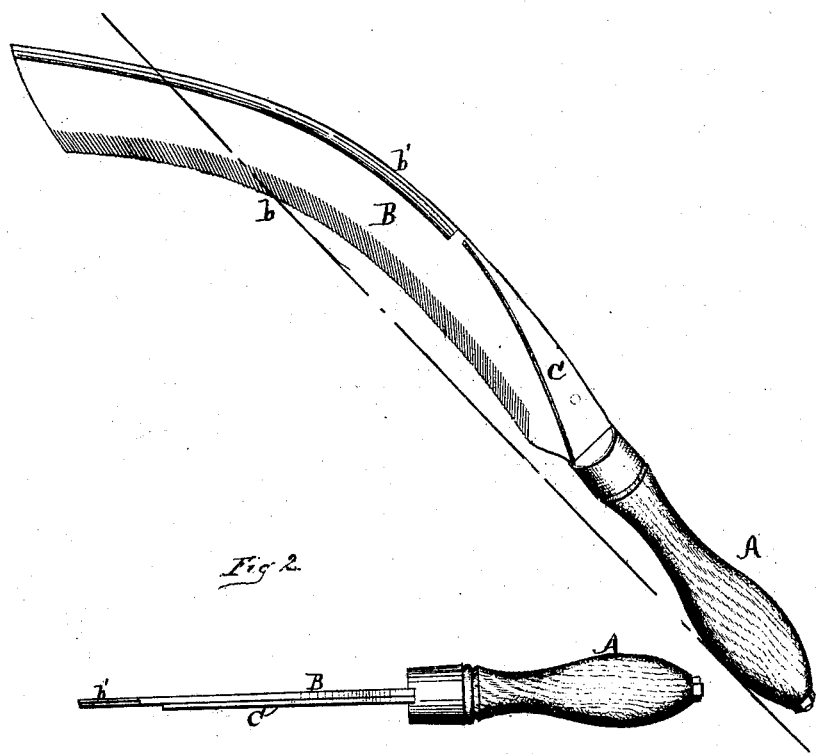

GEORGE D. GOODSELL AND NOYES E. BABCOCK, OF ROCKFORD, ILLINOIS.

Letters Patent No. 99,560, dated February 8, 1870.

IMPROVEMENT IN CORN-STALK-CUTTING KNIFE.

The Schedule referred to in these Letters Patent and making part of the same.

*To all whom it may concern:*

Be it known that we, GEORGE D. GOODSELL and NOYES E. BABCOCK, both of Rockford, in the county of Winnebago, and State of Illinois, have invented a new and improved Combined Corn-Cutter and Pruning-Knife; and we do hereby declare that the following is a full and exact description of the same, reference being had to the accompanying drawings, and to the letters of reference marked thereon.

This invention has for its object the production of an improved implement, which shall be suitable for use in cutting the stalks of corn, and also for pruning-purposes; and to that end, It consists of a curved blade attached to a suitable handle, the inner curve of which is provided with a serrated edge, and the outer with a smooth edge.

In the drawings—

Figure 1 represents a side elevation, and

Figure 2, a top view of our improved implement.

To enable others skilled in the art to make and use our invention, we will now proceed to describe fully its construction and operation.

A represents the handle, which may be constructed of any suitable material, and in any proper form.

B represents the blade, which is attached to the handle A in any suitable manner. It is provided with the inner-curving serrated edge $b$, and outer-curving smooth edge $b'$, as shown in fig. 1.

The serrated edge is intended for use in cutting up the stalks of corn, and the smooth edge for pruning-purposes.

C represents a triangular piece of metal, which is securely riveted to the blade and tang, for the purpose of giving the implement great strength, without materially increasing its weight.

It will be observed that the blade is so arranged, relatively to the handle, that the point of the former nearly meets a parallel line extended for the larger circumference of the handle. In practice it has been found that the relative arrangement of handle and blade gives the latter the proper bearing, and enables the implement to be used for an extended period, without unduly tiring the hand of the operator.

Having thus fully described our invention,

What we claim as new, and desire to secure by Letters Patent, is—

As a new article of manufacture, the implement described, having the handle A, cimeter-shaped blade B, with a smooth edge upon its convex surface, and a serrated edge upon its concave, whether made with or without the strengthening-piece C, as described, for the purpose set forth.

This specification signed and witnessed, this 20th day of November, 1869.

GEORGE D. GOODSELL.
NOYES E. BABCOCK.

Witnesses:
    G. W. FORD,
    T. FEARNSIDE.